United States Patent [19]

Barba et al.

[11] 4,031,187

[45] June 21, 1977

[54] PROCESS FOR THE PRODUCTION OF NITRIC ACID

[75] Inventors: Diego Barba; Fabrizio Battistoni; Candido D'Agostini; Giorgio Macchi, all of Rome, Italy

[73] Assignee: Societa' Italiana Resine S.I.R. S.p.A., Milan, Italy

[22] Filed: Dec. 17, 1975

[21] Appl. No.: 641,613

[30] Foreign Application Priority Data

Dec. 20, 1974  Italy .................................. 30827/74

[52] U.S. Cl. ................................ 423/392; 423/394
[51] Int. Cl.$^2$ ........................................ C01B 21/04
[58] Field of Search ................ 423/392, 393, 394; 203/13

[56] References Cited

UNITED STATES PATENTS

| 2,088,057 | 7/1937 | Handforth | 423/393 |
| 3,099,531 | 7/1963 | Boynton | 423/394 |
| 3,876,752 | 4/1975 | Wendel | 423/394 |

FOREIGN PATENTS OR APPLICATIONS 1,926,435  12/1969  Germany ........................... 423/394

*Primary Examiner*—G. O. Peters
*Attorney, Agent, or Firm*—Brumbaugh, Graves, Donohue & Raymond

[57] ABSTRACT

Nitric acid having a concentration of at least 98% by weight is obtained from a gaseous stream resulting from catalytic oxidation of ammonia and containing nitrogen oxide and steam, by flowing said stream in an oxidation and condensation column in countercurrent with a stream of nitric acid at 40–60 wt.%, recovering nitrogen peroxide at the top of the column, liquefying said peroxide, bringing it into contact with aqueous nitric acid, oxygen and air in a chemical absorption stage, and distilling the resulting superazeotropic nitric acid. A part of the nitric acid discharged from the oxidation column is directly recycled and the remainder is recycled after distillation to give azeotropic acid and remove water, a part of the latter being used for the chemical absorption.

8 Claims, 1 Drawing Figure

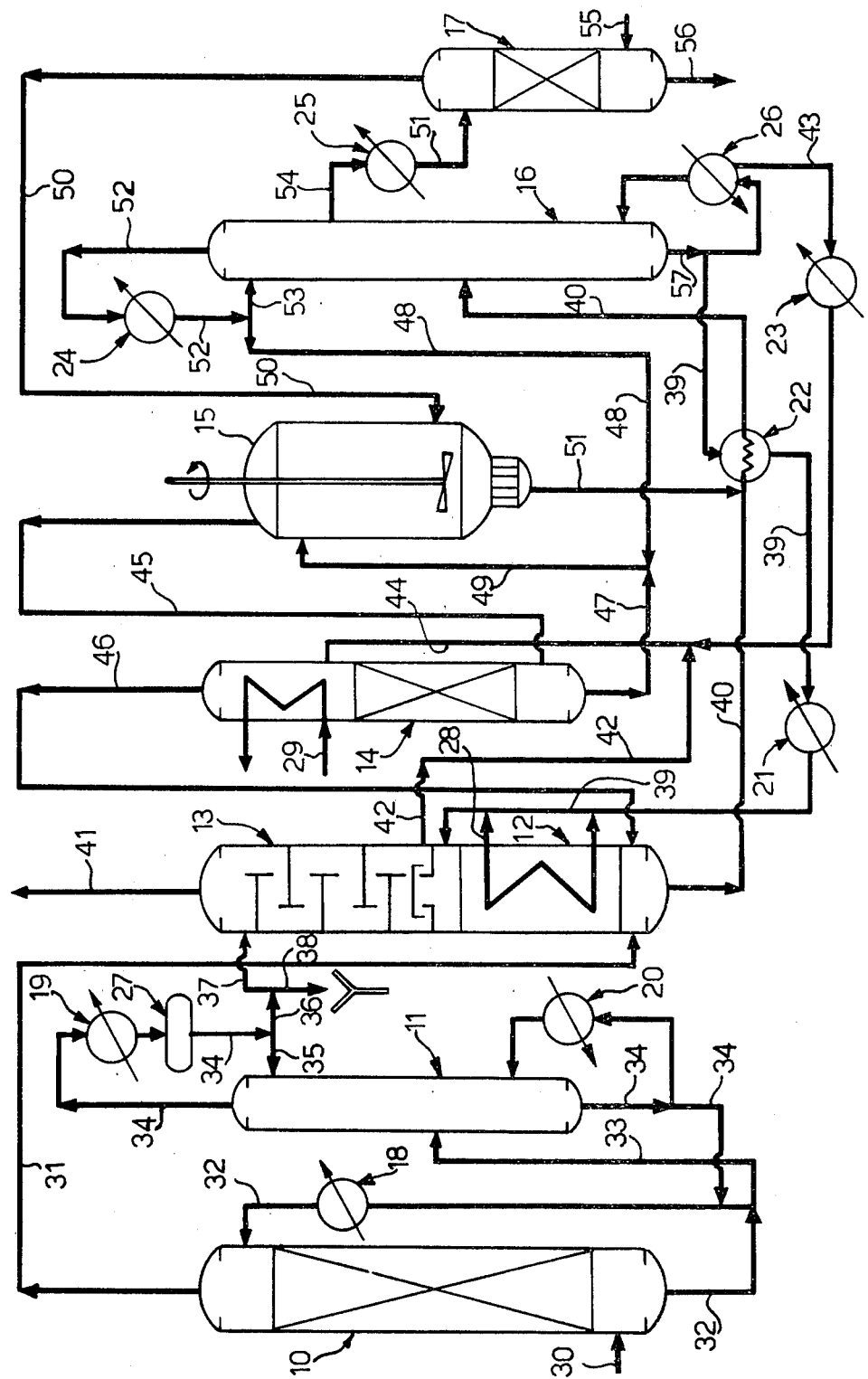

PROCESS FOR THE PRODUCTION OF NITRIC ACID

The present invention concerns an improved process for the preparation of nitric acid having a concentration of at least 98% by weight.

According to what is known in the technique, it is possible to produce nitric acid with a high concentration (98% or more), by the action of a dehydrating agent on the aqueous solutions of nitric acid having an acid content of the order of 50–65% by weight.

The use of dehydrating agents such as, for instance, sulfuric acid and magnesium nitrate, is consequential to the fact that the water-nitric acid mixtures present an azeotrope whose acid content is equal to about 69% by weight.

Furthermore the aqueous solutions with a content of nitric acid in the order of 50–65% by weight are produced by conventional processes wherein ammonia is catalytically oxidized with oxygen or gases containing oxygen followed by an absorption of the nitrogen oxides in water or in diluted by an absorption of the nitrogen oxides in water or in diluted nitric acid.

More particularly, according to said processes, the dehydrating agent is mixed with the aqueous solution of nitric acid and the resulting mixture is distilled to produce highly concentrated nitric acid.

Since the dehydrating agent selectively absorbs the water, or combines with it, is possible by heating to develop nitric acid vapors of a very high concentration.

The residual aqueous solution is then recovered and separately distilled so as to eliminate the water and thus regenerate the dehydrating agent.

This procedure involves an alternated dilution and concentration of the dehydrating agent and the concentration operation requires a great expenditure of energy.

Moreover, equipments of remarkable size an expense are required, because they must be built with corrosion resistant materials.

For these reasons the production of nitric acid of high concentration has been set up, in the technique, starting from the gaseous flow resulting from the catalytic oxidation of ammonia by the so-called direct process.

More particularly, according to said process, a catalytic oxidation of ammonia is first performed by oxygen or by gases containing molecular oxygen, at atmospheric pressure or higher, according to the equation $$4 NH_3 + 5 O_2 \longrightarrow 4 NO + H_2O$$

Then the transformation of the nitrogen oxide into the corresponding peroxide is carried out by the excess oxygen present according to the equation:

$$2 NO + O_2 \longrightarrow 2 NO_2$$

The nitrogen peroxide is, in fact, an equilibrium mixture of $NO_2$ and $N_2O_4$, which in the present specification will be henceforth indicated simply as peroxide.

Said peroxide is removed from the gaseous flow and reacted in an autoclave with oxygen and water (or diluted nitric acid) according to the equation:

$$2 N_2O_4 + 2 H_2O + O_2 \rightleftharpoons 4 HNO_3$$

It is possible to obtain highly concentrated acid (98% or more) in industrially useful times, by the use of oxygen and the application of high pressure, generally higher than 50 atmospheres.

It is preferred, however, to carry out the chemical absorption of the peroxide until an acid with a concentration in the order of 80–90% by weight is produced and then to submit said acid to distillation.

In this case it is possible to utilize air as oxidizing gas, according to the equation $$2 N_2O_4 + 2 H_2O + O_2 + 4 N_2 \rightleftharpoons 4 HNO_3 + 4 N_2$$

and to operate at pressures lower than 10 atmospheres.

A first problem encountered in the production of concentrated nitric acid by the direct process, consists in the removal, at least partial, of the water from the gaseous flow resulting from ammonia catalytic oxidation.

In fact, because of the water content of these gases, an acid having a concentration in the order of 78% by weight would be obtained in the better part of the cases.

According to the known technique, the gaseous flow is submitted to cooling until the water is condensed and separated in the form of an aqueous diluted solution of nitric acid.

In fact, besides the condensation, the following reaction occurs:

$$3 NO_2 + H_2O \rightleftharpoons 2 HNO_3 + NO$$

Therefore a loss of nitrogen oxides occurs in the form of an aqueous diluted acid solution practically unusable.

Besides, for the water separation, condensers of large size are required, taking into account also the fact that there are exchange problems consequential to the low content of water vapor (generally about 17% by volume) in the gaseous flow and problems deriving from the head losses through the condensers.

Another drawback encountered in said processes is the corrosion of the equipments used for the condensation.

For the purpose of separating aqueous solutions with a little content of nitric acid it has been proposed to maintain an extremely low residence time of the gases under the condensation conditions. This fact, though it allows a decrease of the losses of nitrogen oxide, aggravates those problems relative to the exchangers, which have been previously mentioned.

Another problem encountered in the production of concentrated nitric acid by the direct process, consists in the transformation into peroxide of the nitrogen oxide contained in the gaseous flow resulting from the catalytic oxidation of ammonia.

Operating according to the known technique for achieving sufficiently high transformations, lengthy permanence times under the oxidation conditions are required, besides the adoption of low temperatures, especially in those zones of the oxidation equipment where the highest conversions in peroxide are reached.

All that brings forth complications in the equipment and in the production process of concentrated nitric acid.

According to the present invention, nitric acid having a concentration of, at least, 98% by weight, is produced without the help of dehydrating agents, by a simple and economical process which eliminates the drawbacks of the prior art or, at least, reduces them in a substantial way.

Thus, the invention provides a process for the production of nitric acid having a concentration of at least 98% by weight from a gaseous flow obtained by catalytic oxidation of ammonia and containing nitrogen oxide and water vapor, wherein said water is removed from said gaseous flow and said nitrogen oxide is converted into nitrogen peroxide, said peroxide is converted in to superazeotropic nitric acid by chemical absorption in an aqueous solution of nitric acid and said superazeotropic nitric acid is submitted to distillation, characterized in that:

a. said gaseous flow is fed at a temperature of 180°–200° C at the bottom of a column for the condensation of said water and the oxidation of said nitrogen oxide, at the top of which is fed an aqueous solution of nitric acid having a concentration of from 40 to 60 wt.%; said column is operated in countercurrent, at a pressure higher than the atmospheric one and not exceeding 10 atmospheres, at a temperature at the bottom of from the boiling point of the aqueous solution at 30 wt.% of $HNO_3$ to the boiling point of the azeotrope $HNO_3/H_2O$ and at a temperature at the top of from the condensation point of nitrogen peroxide to the condensation point of water vapor; a gaseous flow containing the peroxide, practically devoid of water and nitrogen oxide is recovered at the top of the column, and nitric acid having a concentration ranging from 30 to 55 wt.% is recovered at the bottom;

b. a portion of said nitric acid recovered in (a) is recycled to the top of the oxidation column after cooling and the remaining portion is delivered at intermediate level of a distillation column operating at atmospheric pressure, so as to recover azeotropic nitric acid at the bottom and water vapor at the top; said water vapor being condensed and a portion of the condensed water being recycled as reflux to said distillation column, whereas the remaining portion is discharged; said azeotropic nitric acid being recycled at the top of the column of (a), after suitable cooling;

c. said nitrogen peroxide recovered in (a) is liquefied and brought into contact with a fraction of said remaining portion of water of (b), aqueous nitric acid and air in a chemical absorption stage to give superazeotropic nitric acid, and d. said superazeotropic nitric acid is distilled to produce nitric acid with a concentration of at least 98% by weight. Preferably, the said column of (a) is operated at a pressure of from 5 to 10 atmospheres, at a temperature of 30°–35° C at the top end of 120° C at the bottom and with a contact time of from 10 to 60 seconds. Preferably also, nitric acid having a concentration of about 54 wt.% is fed at the top of the column of (a) and nitric acid having a concentration of about 50 wt.% is discharged at the bottom of the column of (a). Preferably, a column having 8 to 15 theoretical plates is used in (b), said remaining portion of nitric acid being delivered to said column of (b) at a level from the 4th to the 8th theoretical plate beginning from the top, and the bottom temperature of said column being maintained at about 120° C.

Preferably also, one-third of said remaining portion of water of (b) is delivered to said chemical absorption stage of (c).

In an embodiment of the process of this invention, the nitrogen peroxide recovered in (a) is fed at the bottom of an intermediate column for its physical absorption in a flow of superazeotropic nitric acid fed at the top of said intermediate column; said flow of superazeotropic nitric acid containing said absorbed nitrogen peroxise is fed at intermediate level of said distillation column of (d) wherein nitrogen peroxide is recovered at the top and a flow of superazeotropic nitric acid is extracted at the bottom, said flow of superazeotropic acid being delivered to the top of said intermediate column; a flow of aqueous nitric acid is also extracted from the bottom of said column of (d) for the purpose of providing said aqueous nitric acid delivered to stage (c); said nitrogen peroxide issuing from the top of said column of (e) is liquefied and provides the nitrogen peroxide feeding for said stage (c). In a preferred embodiment of the process of this invention, the said stage (c) comprises two absorption zones; aqueous nitric acid and liquified nitrogen peroxide and fed at the top of the first absorption zone, whereas oxygen is fed at the bottom; superazeotropic nitric acid is extracted at the bottom and delivered at intermediate level of said distillation column of (e); unreacted oxygen and nitrogen peroxide are recovered at the top of the column and delivered to the bottom of the second of said absorption zones, whereas said fraction of remaining portion of water of (b) is delivered at the top of said second absorption zone, together with said flow of aqueous nitric acid extracted from the bottom of the distillation column of (c); a flow of aqueous nitric acid is extracted from the bottom of said second absorption zone and provides the feeding in aqueous nitric acid for said first absorption zone.

The nitrogen peroxide which has not reached in said chemical absorption stage (c) is conveniently delivered at the bottom of said intermediate column.

The nitrogen oxide used in the process of the present invention can be produced in the known way by contacting a gaseous flow of ammonia and air with platinum-rhodium catalysts, carrying out the operation at 900°–950° C at atmospheric- or higher than atmospheric pressure. Preferably the gaseous flow contains ammonia in amount ranging from 8 to 12% molar and pressures ranging from 5 to 10 atmospheres are maintained.

The gaseous flow obtained, containing nitrogen oxide and water is then conveyed to a series of equipments for the thermal recoveries, cooled to a temperature in the order of 190° C (180°–200° C) and finally treated according to the process of the present invention. A preferred embodiment of the process of the present invention will be now described with reference to the accompanying drawings.

In the following description the percentages and the ratios are intended by weight unless otherwise specified.

STAGE A

Condensation of the water vapor and transformation of the nitrogen oxide into nitrogen peroxide The gaseous flow containing about 10% by volume of nitrogen oxide and 17% by volume of water vapor is fed at the bottom of column 10, by means of pipe 30. Recycled aqueous nitric acid (concentration ranging from 40 to 60%), previously cooled in exchanger 18 is fed at the top of the column by means of pipe 32.

The operation is performed in column 10 in countercurrent, insuring a close contact between the gas and the liquid, for instance by supplying the column with filling elements or with plates.

Besides, the column is operated at a pressure ranging from 5 to 10 absolute atmospheres, at a temperature having a minimum value, at the top, of the order of 30° C and a maximum value at the bottom of the order of 120° C and with a contact time ranging from 10 to 60 seconds.

Operating under these conditions, the gaseous flow discharged at the top of column 10 by means of pipe 31 is rich in peroxide and substantially devoid of water and nitrogen oxide.

Moreover, nitric acid having a concentration ranging from 30 to 55% by weight is discharged at the bottom of column 10 through pipe 32.

The best results are obtained by feeding at the top of column 10 nitric acid having a concentration of about 54%, carrying out the operation with a temperature at the top of the order of 35° C and at the bottom of 120° C and discharging at the bottom of the column, acid having a concentration of about 50%.

Under these conditions, at the top of the column a gaseous flow is discharged which typically has the following composition: peroxide 15%; nitrogen oxide 0.1% and water 0.7%, the percentage balance being constituted by nitrogen, oxygen and traces of nitric acid.

STAGE B

Distillation of the acid discharged from the stage a)

The nitric acid having a concentration ranging from 30 to 55% discharged at the bottom of column 10 is in part recycled to the top of said column after cooling and the remaining part is fed by means of pipe 33 to distillation column 11 in an intermediate point between the top and the bottom.

Said column 11 contains from 8 to 15 theoretical plates and said remaining part is introduced a level comprised between the 4.th and the 8.th plate, starting from the top. Besides the operation is carried out at atmospheric pressure, with a bottom temperature in the order of 120° C.

Under these conditions azeotropic nitric acid is discharged at the bottom of the column by means of pipe 34 and a fraction thereof is recycled to column 11 through the reboiler 20, while the remaining fraction is mixed with the recycled nitric acid of pipe 32 and the mixture is conveyed to the top of column 10.

The amount of said remaining part of acid which is submitted to distillation in column 11 depends obviously on the desired acid concentrations which one intends to maintain in column 10, said concentrations being selected in the range of values previously mentioned.

On the other hand the magnitude of cooling in exchanger 18 depends on the temperature that one intends should be maintained at the top of column 10, and said temperatures are comprised in the range of values previously specified.

The water vapor discharged through pipe 34, at the top of column 11 is condensed in 19, collected in 27 and in part recycled as reflux at the top of the column by means of pipe 35.

The remaining fraction of the water is withdrawn by means of pipe 36, is partly discharged by means of pipe 38, the remaining part being used in the process of the invention. This remaining part is the part required by the stoichiometric balance for the subsequent reaction of chemical absorption of the peroxide.

In practice two-third of the water distilled are discharged by means of pipe 38 and the remaining one-third is conveyed to column 13 by means of pipe 37.

STAGES C AND D

Separation of the nitrogen peroxide, its chemical absorption and distillation of the superazeotropic acid The gaseous flow coming from pipe 31 is fed at the bottom of column 12; by means of pipe 39 nitric acid having a concentration ranging from 80 to 99% and preferably about 85% is fed at the top of the column.

The physical absorption of peroxide in the acid occurs in column 12 equipped with filling elements or plates, provided with exchanger 28 for temperature control, carrying out the operation in countercurrent and under the following preferred conditions: temperature ranging from 0° to 25° C, pressure ranging from 5 to 10 absolute atmospheres, peroxide concentration in the solution discharged by means of pipe 40, ranging from 5 to 20%.

Operating under these conditions, a gaseous flow whose content in nitrogen oxides is in the order of 1.5% is obtained at the top of column 12.

Said oxides are recovered in column 13 (equipped with filling elements or plates), by countercurrent contact with the water fed at the top by means of pipe 37.

In column 13 the operation is carried out in countercurrent, with preferred values of temperature ranging from 10° to 40° C and of pressure ranging from 5 to 10 absolute atmospheres and a gaseous flow, whose content in nitrogen oxides is lower than 2,000 ppm, is discharged by means of pipe 41 at the top of the column.

This flow may be discharged after treatment by reducing substances, according to the known techniques.

In a preferred embodiment of the process of the present invention, the chemical absorption of the peroxide is carried out through two stages. In particular, with reference to the drawing, the nitric acid having a concentration ranging from 68 to 80% and preferably about 75%, coming from the distillation column 16 through pipe 43, is mixed with the diluted solution of the nitrogen oxides coming by means of pipe 42 from the bottom of column 13. The resulting mixture is fed, by means of pipe 44, at the top of column 14 (fitted with filling elements or plates) and allowed to flow in countercurrent with the gaseous stream containing peroxide and oxygen, coming from reactor 15 and fed at the bottom of column 14 by means of pipe 45.

Optimal results are obtained when the absorption is carried out at temperatures ranging from 30° to 70° C, at pressures ranging from 5 to 10 absolute atmospheres, maintaining in the feed an overall concentration of the acid ranging from 68 to 75% and a content in nitrogen oxides ranging from 40 to 60% and in the output an acid concentration ranging from 70 to 80% and a nitrogen oxides content ranging from 10 to 30%.

Therefore in column 14 the chemical absorption of nitrogen peroxide is performed on the basis of the following equations:

$$3 NO_2 + H_2O \rightleftharpoons 2 HNO_3 + NO$$

$$2\ NO + O_2 \rightarrow 2\ NO_2$$

Column 14 is conveniently fitted with a reflux condenser indicated by 29 in the drawing.

The gaseous flow issuing from the top of column 14 has a nitrogen oxides content in the order of 20% and a temperature of about 20° C and is conveniently fed to the bottom of column 12, by means of pipe 46. The nitrogen oxides present in said gaseous flow are thus recovered almost completely.

Referring again to the drawing, the liquid peroxide coming from pipe 48, is mixed with the products discharged from column 14 through pipe 47. The resulting mixture is conveyed to reactor 15 by means of pipe 49.

Reactor 15 is a normal container supplied with a stirrer. Air is fed by means of pipe 50 to said reactor.

In reactor 15, optimal conditions are realized by operating at a temperature ranging from 30° to 70° C, at a pressure ranging from 5 to 10 absolute atmospheres with a peroxide/nitric acid ratio in the feed ranging from 0.15:1 to 3:1 and with an excess of air ranging from 50 to 200% with respect to the stoichiometric amount required for the reaction.

Under these conditions superazeotropic nitric up to 90% and generally of the order of 80–90% is formed according to the equation:

$$2\ N_2O_4 + H_2O + O_2 \rightleftarrows 2\ HNO_3$$

The gaseous flow issuing from reactor 15 is conveyed to the bottom of column 14 by means of pipe 45.

The liquid products of the reaction are discharged by means of pipe 51 and mixed with the nitric acid solution of peroxide, coming from column 12 by means of pipe 40.

The mixture obtained, containing nitric acid having a concentration ranging from 80 to 90% and peroxide ranging from 15 to 35% is fed to distillation column 16, after thermal exchange in 22.

Column 16 contains from 10 to 20 theoretical plates and the mixture is delivered at a level comprised between the 8.th and the 16.th plate starting from the top.

The distillation is carried out under a pressure ranging from 1.5 to 3 absolute atmospheres, with a temperature at the top in the order of 30° C and at the bottom of 130° C.

A liquid flow (98% or more in nitric acid) is withdrawn, by means of pipe 54, from the side of the column, preferably from 2 to 5 plates below the top.

This side flow of acid is first cooled in exchanger 25° to about 60° C and then brought into contact in column 17 with air fed by means of pipe 55.

After said bleaching treatment the nitric acid at 98% or more is recovered by means of pipe 56. The air is then fed to reactor 15 by means of pipe 50. The gaseous peroxide discharged at the top of column 16 through pipe 52, is condensed in exchanger 24 and the liquid is in part recycled as reflux at the top of the column by means of pipe 53, the remaining part being fed to the chemical absorption column 15 through pipe 48.

During the distillation it is convenient to maintain a reflux ratio in the order of 1.5.

A flow of nitric acid having a concentration ranging from 80 to 99%, which is recycled to column 12 and a bottom product having a concentration ranging from 68 to 80%, which is recycled to column 14 are, in addition, withdrawn from column 14. Obviously the point of withdrawal will depend on the desired concentration of the acid.

In the drawing is shown a preferred embodiment, according whereto the acid having a concentration of about 85%, discharged from column 16 through pipe 57, is partially fed to column 12 by means of pipe 39, after cooling the exchangers 22 and 21, the remaining part being conveyed to reboiler 26.

Moreover, a second flow of acid having a concentration in the order of 75% is withdrawn from the reboiler 26 of column 16 and conveyed to column 14 by means of pipe 43, after cooling in exchanger 23.

It should be noted that the previously described stage (c) constitutes only a preferred embodiment. Other solutions for this stage can, in fact, be chosen. For example the acid solution of peroxide, discharged from column 12, can be heated in order to develop gaseous peroxide, and said gas can be cooled to the point of liquefaction.

The liquid peroxide thus obtained can be utilized for the chemical absorption.

First of all the process of the present invention offers the advantage of realizing through a single operation the nitrogen oxide oxidation to the corresponding peroxide and the removal of the water from the gaseous flow obtained by catalytic combustion of ammonia.

Said oxidation of the nitrogen oxide and removal of the water are realized in a single equipment and this diversely from the known technique, which teaches the use of a condenser and of an oxidation tower in series.

Therefore a large saving is realized in that a contact condenser is substituted for a surface condenser, which brings forth a reduction of the cost greater than 50% with respect to the cost of the surface equipment.

It should also be noted that the surface condenser is extremely costly from the corrosion viewpoint, because the corrosion is enhanced during condensation. These phenomena do not occur in the case of the contact equipment realized with a tower provided with filling elements, as in the case of the present invention.

The process of the present invention offers in addition the advantage relative to the flexibility, in that by dealing appropriately with the content of the acid fed to equipment 10 it is possible to obtain a total recovery of the nitrogen oxides as peroxide for the production of concentrated nitric acid, or else to realize a partial recovery of the oxides with the additional production of nitric acid having a concentration equal to or lower than the azeotropic concentration at the bottom of column 11.

In the particular embodiment downstream of column 11 previously described, the advantages relating to the compactness of the plant are also obtained, in that:

the flash drum for the desorption of the peroxide is eliminated because said desorption occurs in the final column of distillation;

the separation of the peroxide, of the concentrated nitric acid (98% or more) and of the nitric acid of a lower concentration is realized in a single column (column 16) instead of two columns of the known technique;

the condensation of the peroxide coming from chemical absorption occurs in a single equipment;

the reflux condenser 29 avoids the necessity of a condensate accumulator and of a pump which will be required by a normal surface equipment.

Other advantages of the process described consist in the simplicity and ease of control and this, above all, because of the smaller number of equipments required.

Finally, there exist the advantages in relation to the construction materials for the equipment. In view of the conditions under which the operation is carried out, those costly expedients of the prior art, such as, for example, the construction of equipments with sections of different materials, are not required.

In the Example which follows the parts and the percentages are intended by weight if not otherwise specified.

EXAMPLE

With reference to the accompanying drawing, column 10 is fed through pipe 30 at a rate of 9,657 Kg/hr with a mixture having the following composition: $N_2$ 71.6%, $O_2$ 6.1%, $NO_2+N_2O_4$ 5.7%, NO 6.7% and $H_2O$ 11.3%, and through pipe 32 at a rate of 34,632 Kg/hr with a liquid having the following composition: $HNO_3$ 55.4% and $H_2O$ 44.6%.

Column 10 contains a filling interspersed with empty spaces.

The temperature at the top is of 35° C with a pressure of 7.5 absolute atmospheres, while at the bottom a temperature of 120° C is reached.

The gaseous flow discharged at the top of column 10 and delivered to the bottom of column 12 through pipe 31 at the rate of 8,658 Kg/hr, has the following composition: 79.2% $N_2$, 1.7% $O_2$, 18.1% $NO_2 + N_2O_4$, 0.2% NO, 0.6% $H_2O$ and 0.2% $HNO_3$.

The liquid flow discharged from column 10 through pipe 32 at the rate of 35,631 Kg/hr has the following composition: 46.2% $H_2O$ and 53.8% $HNO_3$. A portion of said liquid flow is substracted and delivered to column 11 through pipe 33 at the rate of 5,405 Kg/hr.

Column 11 is an atmospheric distillation column with riddled plates and the flow coming through pipe 33 is delivered at the level of the tenth plate from the top. The temperature is of 100° C at the top and 120° C at the bottom.

1,665 Kg/hr of practically pure water are withdrawn at the top of the column (pipe 34), and this water is condensed and in part refluxed (665 Kg/hr), in part discharged (689 Kg/hr) and in part delivered at the top of column 13 (310 Kg/hr).

A flow of 4,406 Kg/hr of acid about azeotropic (composition: $HNO_3$ 66%, $H_2O$ 34%) is discharged at the bottom of column 11 through line 34, admixed with the recycle flow of pipe 32 and the whole is delivered at the top of column 10, after cooling in exchanger 18.

In addition to the flow of pipe 31, column 12 is fed at the bottom through pipe 46 with a mixture having the following composition: 68.10% $N_2$, 7.20% $O_2$, 24.50% $NO_2+N_2O_4$ and 0.05% $H_2O$, at the rate of 1,931 Kg/hr, and at the top, through pipe 39 and at a rate of 17,982 Kg/hr, with a stream having the following composition: 0.1% $N_2O_4$, 14.9% $H_2O$, 85% $HNO_3$.

Column 12 is a packed column provided with an intermediate cooling. Besides, the operation is carried out in countercurrent, at a pressure of 7.5 atmospheres and at an average temperature of 5° C.

The flow discharged at the bottom of column 12 through pipe 40 at a rate of 19,980 Kg/hr has the following composition: 9.7% $N_2O_4$, 13.6% $H_2O$, 76.7% $NHO_3$. This flow is preheated in heat exchanger 22 and delivered to column 16.

The gaseous flow issuing at the top of column 12 at a rate of 8,591 Kg/hr has the following composition: 95.5% $N_2$, 3.0% $O_2$, 1.0% $NO_2 + N_2O_4$ and 0.5% $H_2O$ + $HNO_3$. This flow is passed into column 13 containing 8 riddled plates, and stripped in said column with the aqueous flow delivered through pipe 37.

At the top of column 13, a gaseous flow of the following composition: 95.50% $N_2$, 3.00% $O_2$, 0.1% $NO_2 + N_2O_4$, 0.09% NO and 1.31% $H_2O$ + $HNO_3$, is discharged at a rate of 8,561 Kg/hr through pipe 41. Said gaseous flow is submitted to a last stripping treatment of the nitrogen oxides.

At the bottom of column 13, a liquid flow having the following composition: 27.5% $HNO_3$ and 72.5% $H_2O$, is tapped through pipe 42 at a rate of 340 Kg/h, and delivered to column 14.

The peroxide obtained at the top of column 16 is condensed in 24 and delivered in part through 48 to reactor 15 and refluxed in part to column 16 through pipe 53.

Column 14 is instead fed through pipe 44 at a rate of 3,530 Kg/hr with a liquid flow having the following composition: 70.8% $HNO_3$ and 29.2% $H_2O$, and at the bottom, through pipe 45 and at a rate of 3,163 Kg/hr, with a flow of the following composition: 41.50% $N_2$, 8.50% $O_2$, 45.40% $NO_2 + N_2O_4$, 1.70% $H_2O$ and 2.90% $HNO_3$.

At the top of column 14, a flow is discharged through pipe 46, after cooling to 20° C in the reflux condenser 29, and delivered to column 12 at the rate and composition previously indicated. At the bottom of column 14, a liquid flow having the following composition: 6.7% $NO_2 + N_2O_4$, 74.8% $HNO_3$ and 18.5% $H_2O$, is discharged through pipe 47 at a rate of 4,762 Kg/hr, admixed with the flow of pipe 48 and the resulting mixture, having the following composition: 47.8% $NO_2 + N_2O_4$, 10.4% $H_2O$ and 41.8% $HNO_3$, is delivered to reactor 15 through pipe 49 at a rate of 8.541 Kg/hr.

Reactor 15 is a stirred container which is fed, through pipe 50 and at a rate of 1,755 Kg/hr, with a gaseous flow coming from the bleaching tower 17 and having the following composition: 74.9% $N_2$, 22.7% $O_2$, 1.4% $H_2O+HNO_3$ and 1.0% $NO_2 + N_2O_4$.

Reactor 15 is operated at 8 atmospheres and at a temperature of 60° C.

A gaseous flow is discharged at the top through pipe 45 at the rate and with the composition previously indicated.

A liquid flow having the following composition: 24.8% $N_2O_4$, 63.9% $HNO_3$ and 11.3% $H_2O$, is discharged through pipe 51 at a rate of 7,133 Kg/hr. Said liquid flow is admixed with the flow of pipe 40 coming from column 12 and the whole is delivered to column 16.

Column 16 consists of a higher section with riddled plates and of a lower packed section.

Column 16 is fed between the two sections and is operated at a pressure of 2.4 atmospheres at the top, for a temperature of 40° C.

At the top, there is obtained a gaseous flow consisting of practically pure peroxide, at a rate of 6,443 Kg/hr, whereof a portion of 4,662 Kg/hr is refluxed to the first plate.

From the 19.th plate, a liquid flow having the following composition: 1.2% $NO_2 + N_2O_4$, 98.1% $HNO_3$ and 0.7% $H_2O$, is tapped at a rate of 2,162 Kg/hr, cooled in exchanger 25 and delivered to the bleaching tower at the bottom of which is collected the specified acid produced.

From the flow discharged at the bottom of column 16, a portion is withdrawn through pipe 39 and delivered to the top of column 12 at the rate and with the composition previously indicated. The remaining portion is delivered to reboiler 26 and recycled to column 16, at a temperature of 130° C, a rate of 3.190 Kg/hr and with the following composition: 75.45% $HNO_3$ and 24.55% $H_2O$.

This procedure permits to realize column 16 with a single type of material, since the concentration of the acid within the inside of the column never drops below 85%.

We claim:

1. A method for the production of nitric acid having a concentration of at least 98% by weight from a gaseous flow obtained by catalytic oxidation of ammonia and containing nitrogen oxide and water vapor, wherein said water is removed from said gaseous flow and said nitrogen oxide is converted into nitrogen peroxide, said peroxide is converted into superazeotropic nitric acid by chemical absorption in an aqueous solution of nitric acid and said superazeotropic nitric acid is submitted to distillation, which comprises: (a) introducing said gaseous flow at a temperature of 180°–200° C. at the bottom of a column for the condensation of said water and the oxidation of said nitrogen oxide, and introducing at the top of said column an aqueous solution of nitric acid having a concentration of from 40 to 60 wt.%; operating said column in countercurrent, at a pressure higher than the atmospheric one and not exceeding 10 atmospheres and at a temperature at the bottom of from the boiling point of the aqueous solution at 30 wt.% of $HNO_3$ to the boiling point of azeotrope $HNO_3/H_2O$ and at a temperature at the top of from the condensation point of nitrogen peroxide to the condensation point of water vapor; recovering a gaseous flow containing the peroxide, practically devoid of water and nitrogen oxide at the top of the column, and nitric acid having a concentration ranging from 30 to 55 wt.% at the bottom; (b) recycling a portion of said nitric acid recovered in (a) to the top of the oxidation column after cooling and delivering the remaining portion at intermediate level of a distillation column operating at atmospheric pressure, so as to recover azeotropic nitric acid at the bottom and water vapor at the top; condensing said water vapor, recycling a portion of the latter as reflux and discharging the remaining portion; recycling said azeotropic acid at the top of the column of (a) after cooling, together with said recycle portion of nitric acid of (a); (c) liquefying said nitrogen peroxide recovered in (a) and bringing it into contact with a fraction of said remaining portion of water of (b), aqueous nitric acid and air in a chemical absorption stage to give superazeotropic nitric acid; and (d) distilling said superazeotropic nitric acid to produce nitric acid with a concentration of at least 98% by weight; said nitrogen peroxide recovered in (a) is fed at the bottom of an intermediate column for its physical absorption in a flow of superazeotropic nitric acid fed at the top of said intermediate column; said flow of superazeotropic nitric acid containing said absorbed nitrogen peroxide is fed at intermediate level of said distillation column of (d) wherein nitrogen peroxide is recovered at the top and a flow of superazeotropic nitric acid is extracted at the bottom, said flow of superazeotropic acid being delivered to the top of said intermediate column; a flow of aqueous nitric acid is also extracted from the bottom of said column of (d) for the purpose of providing said aqueous nitric acid delivered to stage (c); said nitrogen peroxide issuing from the top of said column of (c) is liquefied and provides the nitrogen peroxide feeding for said stage (c).

2. The method of claim 1, wherein said column of (a) is operated at a pressure of from 5 to 10 atmospheres, at a temperature of 30°–35° C at the top and of 120° C at the bottom and with a contact time of from 10 to 60 seconds.

3. The method of claim 1, wherein nitric acid having a concentration of about 54 wt.% is fed at the top of the column of (a) and nitric acid having a concentation of about 50 wt.% -diamino-50$\mu$is discharged at the bottom of the column of (a).

4. The method of claim 1, wherein a column having 8 to 15 theoretical plates is used in (b), said remaining portion of nitric acid being delivered to said column of (b) at a level from the 4.th to the 8.th theoretical plate beginning from the top, and the bottom temperature of said column being maintained at about 120° C.

5. The method of claim 1, wherein one-third of said remaining portion water (b) is delivered to said chemical absorption stage of (c).

6. The method of claim 1, wherein said stage (c) comprises two absorption zones; aqueous nitric acid and liquified nitrogen peroxide and fed at the 20$\mu$the first absorption zone, whereas oxygen is fed at the bottom; superazeotropic nitric acid is extracted at the bottom and delivered at intermediate level of said distillation column of (c); unreacted oxygen and nitrogen peroxide are recovered at the top of the column, and delivered to the bottom of the second of said absorption zones, whereas said fraction of remaining portion of water of (b) is delivered at the top of said second absorption zone, together with said flow of aqueous nitric acid extracted from the bottom of the distillation column of (c); a flow of aqueous nitric acid is extracted from the bottom of said second absorption zone and provides the feeding in aqueous nitric acid for said first absorption zone.

7. The method of claim 1, wherein the nitrogen peroxide which has not reacted in said chemical absorption stage (c) is delivered at the bottom of said intermediate 20$\mu$ 8. The method of claim 6, wherein the nitrogen peroxide which has not reacted in said second absorption zone of 20$\mu$stage (c) is delivered at the bottom of said intermediate column. 99.55$\mu$

* * * * *

UNITED STATES PATENT AND TRADEMARK OFFICE
CERTIFICATE OF CORRECTION

PATENT NO. : 4,031,187
DATED : June 21, 1977
INVENTOR(S) : Barba et al

It is certified that error appears in the above-identified patent and that said Letters Patent are hereby corrected as shown below:

Column 1, line 19, "arc" should read --are--;
Column 1, lines 23-24, delete "by an absorption of the nitrogen oxides in water or in diluted";
Column 1, line 39, "an" should read --and--;
Column 1, line 51, that part of the equation reading "+ $H_2O$" should read --+ 6 $H_2O$--;
Column 2, line 1, "pressure" should read --pressures--;
Column 3, line 54, "end" should read --and--;
Column 4, line 7, "peroxise" should read --peroxide--;
Column 4, line 35, "reached" should read --reacted--;
Column 5, line 58, "temperature" should read --temperatures--
Column 6, line 4, "two-third" should read --two-thirds--;
Column 7, line 24, after "nitric" insert --acid--;
Column 7, line 50, "25°" should read --25--;
Column 8, line 7, "the exchangers" should read --in exchangers--;
Column 9, line 35, "substracted" should read --subtracted--;

UNITED STATES PATENT AND TRADEMARK OFFICE
CERTIFICATE OF CORRECTION

PATENT NO. : 4,031,187
DATED : June 21, 1977
INVENTOR(S) : Barba et al

It is certified that error appears in the above-identified patent and that said Letters Patent are hereby corrected as shown below:

```
Column  9, line 67, "NHO3" should read --HNO3--;
Column 12, line 24, delete "-diamino-50µ";
Column 12, line 33, "water" should read --of water of--;
Column 12, line 37, "20µ" should read --top of--;
Column 12, line 55, "20µ" should read --column.--;
Column 12, line 58, delete "20µ"; and
Column 12, line 59, delete "99.55µ".
```

Signed and Sealed this

*Fifteenth* Day of *November 1977*

[SEAL]

Attest:

RUTH C. MASON
*Attesting Officer*

LUTRELLE F. PARKER
*Acting Commissioner of Patents and Trademarks*